Figure 1:
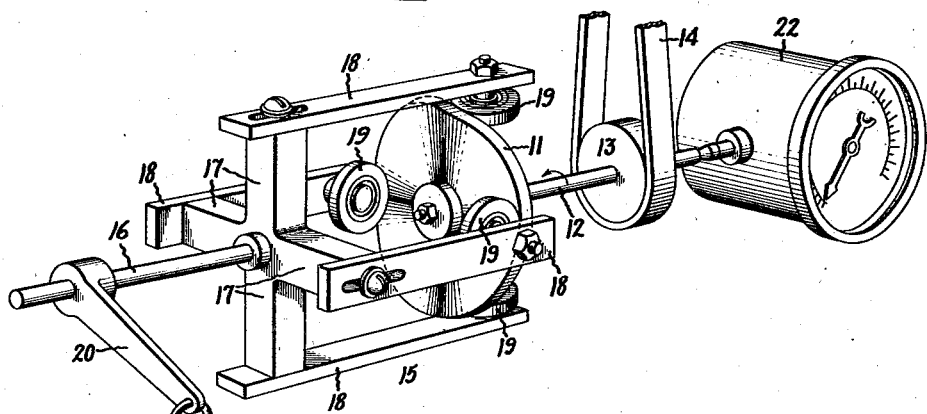

Sept. 7, 1937.   A. V. BEDFORD   2,092,632
VISCOSIMETER
Filed Dec. 22, 1933

Inventor:
Alda V. Bedford,
by Harry E. Dunham
His Attorney.

Patented Sept. 7, 1937

2,092,632

UNITED STATES PATENT OFFICE 2,092,632

VISCOSIMETER

Alda V. Bedford, Collingswood, N. J., assignor to General Electric Company, a corporation of New York Application December 22, 1933, Serial No. 703,573

11 Claims. (Cl. 265—11)

My invention relates to methods and apparatus for measuring the physical characteristics of materials and concerns particularly viscosimeters and methods and apparatus for utilizing the property of viscosity of various substances.

I have found that some solids and plastic materials have a property other than mass or elasticity which I have called viscosity by analogy to a comparable property in liquids, although solids cannot have viscosity in a sense heretofore thought of in connection with liquids since their viscosity cannot be measured by observing the rate of flow of the material through an orifice as is often done in the case of liquids.

Viscosity in the sense here intended may be defined as the property of matter by virtue of which it resists or opposes variations in the rate of change of strain, deformation, or flexure. Viscosity is distinguished from elasticity in that the latter property enables matter to resist merely strain instead of variations in the rate of strain or in the rate of change in shape or dimension; in other words, the force of viscosity varies with instantaneous velocity of the straining, whereas the force of elasticity varies with the amount of straining. Furthermore, the force of viscosity always acts in a direction opposite to the direction of change of strain so that it results in the permanent absorption of energy which appears as heat, whereas the direction of the force of elasticity is always against the direction of strain and it results merely in a storing of energy which is given out by the strained body when the strain is relieved.

The viscosity of certain materials has been utilized in various applications in the useful arts, particularly in connection with suppression of vibration and noise by damping; for example, the transmission of vibration through solid members may be prevented by the interposition of viscous material of the proper characteristics in a portion of the solid members. For instance, the transmission of vibration from a motor to the supporting members is prevented by interposing a sheet of plastic material between the motor base and the motor mounting. The absorption of vibration in this manner also overcomes resonance by preventing amplification of a vibration in case the natural period of vibration of mechanical members attached to the vibrating body happens to be the same as the period of the vibration to be suppressed. The viscous material, in this case, prevents transmission of vibration both by absorption of the energy of vibration and by altering the mechanical characteristics of the supporting members so that they no longer have a natural period of vibration.

In acoustics, proper damping materials may be used for absorbing the sound waves which would otherwise be reflected from the walls of a room thereby preventing echo and reverberation which, in the case of large rooms, tends to interfere with the original sounds, making them unintelligible or discordant.

It is an object of my invention to provide apparatus for studying the characteristics of various materials, determining their suitability for use as damping materials, and discovering new uses for their properties. For example, I have found that a new type of clutch may be constructed by utilizing a disc of plastic material in the power transmission element for the purpose of causing the torque transmitted to the driven member to vary with difference in speeds between the driving and driven members.

More specifically, one of the objects of my invention is to provide a method and apparatus for determining the viscosity of solids and plastic materials and the relationship between variations in viscosity and the rate of change of strain in the material.

Another object is a determination of the suitability of various substances for use as damping materials and for use in the suppression of vibration, noise, echo, etc.

Another object is to facilitate the determination of the variations of these characteristics of materials with variations in temperature, age, humidity, fatigue, and other conditions.

Still another object of my invention is the determination of the suitability of various materials for use in direct or in yielding power transmissions.

Further objects of my invention are the provision of arrangements for transmitting power from one shaft to another, for gradually setting machinery in motion, for making the torque transmitted from one shaft to another dependent upon the difference in speeds of the two shafts, and for limiting the torque transmitted to a given shaft at a given speed without limiting the power transmitted at reduced speeds to that corresponding to the maximum torque transmissible at the greater speed.

Other and further objects and advantages of my invention will become apparent as the description proceeds.

In carrying out my invention in its preferred form, I provide means for subjecting a specimen of material to be tested to a repeated cycle of reversals in strain or flexure. Preferably, the arrangement is such that the energy required to maintain the cycle of reversals in strain is provided by a rotating shaft and the torque is transmitted to a torque measuring device through the specimen. In this manner, the torque transmitted at any given speed of the rotating member provides a measure of the amount of energy dissipated in the specimen by subjecting it to the reversing strain cycle.

In a modified form of my invention, a driven shaft may be substituted for the torque measuring device so that the apparatus becomes a variable torque power transmitting device or coupling.

Figure 2:
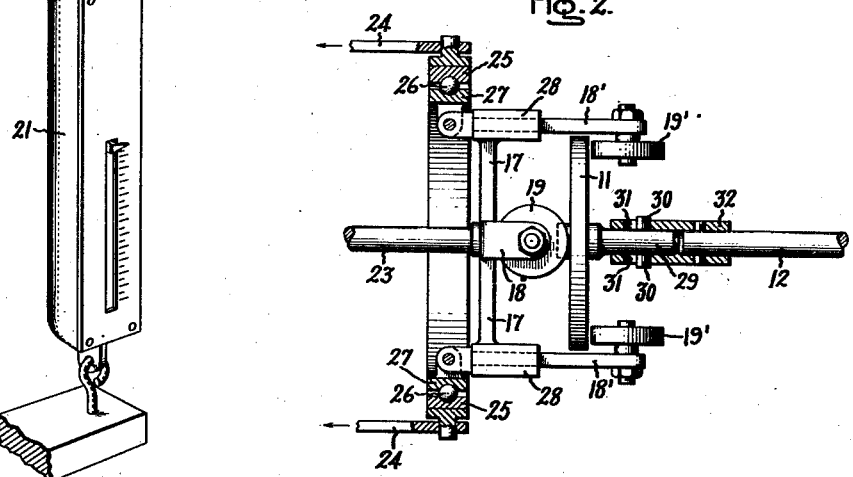

The features of my invention which I believe to be novel and patentable will be pointed out in the claims appended hereto. A better understanding of my invention, itself, however, may be obtained by referring to the following description taken in connection with the accompanying drawing in which Fig. 1 is a perspective view representing diagrammatically one form of viscosity measuring apparatus constructed in accordance with my invention, and Fig. 2 is an elevation, partially in cross section, representing a variable torque coupling or clutch constituting another embodiment of my invention.

In carrying out my invention, I arrange the apparatus so that a specimen of viscous material is subjected to a repeated cycle of reversals in strain or repeatedly deformed in opposite directions. The apparatus is arranged so that a torque is transmitted through the specimen to be tested. I have shown a suitable arrangement for accomplishing this result in the drawing, but it will be understood that I am not limited to the precise construction disclosed. I prefer to utilize a specimen in the form of a flat disc 11, removably attached to a revolving shaft 12 coaxial with the disc specimen 11 to which power is applied through the pulley 13 and the belt 14, which, in turn, is driven by a source of power not shown since the type of power supplied does not form a part of my invention. I provide a second rotatable member 15 mounted on a shaft 16 and comprising the cross arms 17 carrying adjustably mounted members 18 parallel with the axis of the shaft 16 and carrying rollers 19 preferably mounted on low friction bearings, such as ball bearings, and serving to deform the disc 11 by pressing in opposite directions against the edges thereof. A torque measuring device is attached to the shaft 16 which may take the form of an arm 20 keyed to the shaft 16 and connected at its end to a force measuring device, such as the spring balance 21. Preferably a tachometer or speed responsive device 22 is connected to the revolving shaft 12 in order that the relationship between the torque transmitted through the disc 11 and the speed of rotation may be studied.

It will be seen that the rollers 19 put two distinct waves in the periphery of the disc sample but, since the frame 15 does not rotate except by a limited amount, the rollers 19 will cause these waves to move around the disc with respect to the specimen. The surface of the disc 11 is continuously warped but, since every portion of the surface is deflected twice to the left and twice to the right in making a complete revolution, every portion of the specimen is subjected to two complete cycles of reversal in strain or flexure for each revolution of the shaft 12. Since each cycle is completed during the time required for the shaft 12 to make a half revolution, the rate of change in the strain or the velocity of the strain is proportional to the speed of revolution of the shaft 12.

The energy absorbed by the specimen 11 or by friction in the rollers 19 will appear as torque on the lever arm 20. The torque on the lever arm 20 is, of course, determined by the energy dissipated in the apparatus and the speed of the revolving shaft 12. Only the opposing force of viscosity in the sample 11, or the forces which vary with the velocity of strain, can produce a torque on the torque arm. The opposing forces in the specimen 11, due to its properties of mass and elasticity, cannot produce torques on the torque arm since they do not cause a continuous absorption of energy. Consequently, the torque measured gives a measure of the viscosity of the test sample after correction has been made for the friction in the rollers. The correction for roller friction can readily be made by independently calculating or testing the friction of the rollers or by substituting for the test specimen another specimen having negligible or no viscosity. I have found that this correction is usually negligible and may be neglected in comparison with the torque due to the viscosity of the test sample.

The relationship between the properties of mass, elasticity, and viscosity of the specimen 11 may readily be represented by resorting to the electromechanical analogy in which elasticity is analogous to capacity and mass to inductance. Then, the energy absorbing property or the viscosity which my apparatus is designed to determine is analogous to electrical resistance. The analogy holds for strict mathematical analysis since the changes due to viscosity depend upon the velocity of strain just as the voltage drop across the resistance varies with the current.

I have found that various materials differ both in the magnitude and in the nature of their viscous properties. For example, it has been found that a sample of a flexible alkyd resin tested in my apparatus gives a constant proportionality between speed of rotation and torque, indicating that it has, over the frequency range tested, a constant damping value which means that it has constant "resistance" in the electromechanical analysis. On the other hand, a sample of fairly hard rubber exhibited a decrease in viscosity with increase in frequencies. These tests indicate that alkyd resin was a suitable material in this respect for damping of audio-vibratory devices and that this sample of rubber was not.

Since considerable expense is frequently involved in providing noise and vibration damping facilities in buildings and machinery, it obviously will be of great value to have a machine for testing the damping properties of the proposed materials beforehand in preference to merely equipping the building or machinery with a given type of damping material and approximately determining its efficacy by experience.

In improving the acoustic properties of lecture and concert halls, for instance, by coating the surfaces of the walls, ceilings, and furniture with layers of damping material to absorb the sound, it is obvious that a great expense is involved. It would be difficult to compare the value of different damping materials, comparing the acoustics produced, without completely reequipping the hall, since the acoustic properties of different halls vary with their shapes and dimensions and no good comparison of the damping properties of different materials could be obtained by measuring the strength of echo in different halls.

The viscous properties of solid and plastic materials may also be utilized in power transmission. For example, the apparatus represented in Fig. 2 may be utilized as a coupling or as a clutch for transmitting power from the revolving shaft 12 to a second shaft 23 or vice versa, one shaft being the driving member and the other shaft being the driven member. If the disc 11 is composed of a material such as an alkyd resin, for example, the torque transmitted from one shaft to the other may be made to vary in proportion to the difference in speeds between the two shafts, in this manner permitting power to be applied to a driven shaft in a different manner than is possible in the case of ordinary friction clutches heretofore used, since these clutches operate on the surface friction between the surfaces of the driving and the driven members and sliding surface friction is substantially constant regardless of speed.

In arranging the apparatus as a clutch, one pair of roller supporting members 18' is made axially movable with respect to the other pair 18 and is arranged in such a manner that the relative axial positions of the rollers 19 and 19' may be varied by moving the members 24 in either direction axially. The members 24 are attached to the outer race 25 of a ball bearing comprising the steel balls 26, the inner race 27, and the aforesaid outer race 25. The inner race 27 is attached to the members 18' which are slidably mounted in the sleeves 28 carried by the cross arms 17. The stub shaft 29 on which the disc 11 is mounted is provided with pins 30 engaging slots 31 in a sleeve 32 fastened to the shaft 12 so that the disc 11 is permitted to slide axially with respect to the shaft 12 but is constrained to rotate with shaft 12 as the rollers 19' are moved to the left by moving the members 24. When it is desired to transmit power between the shafts 23 and 12, the members 24 are moved to the left causing the disc 11 to be deformed in the manner described in connection with Fig. 1 so that a torque is transmitted through it between the shafts 23 and 12. If desired, the rollers 19 and 19' may be attached to the members 18 and 18' by means of bearings having a predetermined amount of friction in order that, when the difference in speeds between shafts 12 and 23 falls to a predetermined value, the rollers 19 and 19' will lock in position by reason of static friction and the driven shaft will be brought up to and held to the speed of the driving shaft. When the torque exceeds an amount depending upon the friction provided in the bearings of the rollers 19 and 19', however, a slippage will take place and the apparatus will function as a slip clutch. The operation will differ from an ordinary slip clutch, however, in that, as the difference in speeds of the two shafts increases, the torque transmitted will be increased and, for this reason, a greater power will be transmissible at reduced speeds than in the case of a simple friction slip clutch in which the maximum torque transmissible at any speed is limited to the slipping torque at maximum running speed.

I have shown and particularly described certain embodiments of my invention and certain methods of operation embraced therein for the purpose of explaining its principle and showing its application but it will be obvious to those skilled in the art that many modifications and variations are possible and I aim, therefore, to cover all modifications and variations which fall within the scope of my invention which is defined in the appended claims.

For convenience, I have used the term "solids" in the specification and claims to refer both to true or crystalline solids and to plastics and amorphous bodies, such as glasses, glues, and waxes, which may be regarded as being merely liquids which are so viscous as to be quite rigid.

What I claim as new and desire to secure by Letters Patent of the United States is:

1. A viscosimeter for solids comprising in combination, a driving and a driven member relatively rotatable with respect to each other, means for rotating said driving member, one of said members being adapted to be attached to a specimen of solid material in disc form, the viscosity of which is to be measured, the other of said members carrying a plurality of rolling elements bearing against the edges of said disc specimen from opposite sides and positioned to deform said disc specimen by warping the surfaces thereof, and means responsive to the torque transmitted to said driven member through said disc specimen.

2. A transmission for transmitting torque between two shafts dependent upon the relative speeds of rotation thereof comprising a disc attached to one of said shafts coaxial therewith and a frame attached to the other of said shafts, said frame having portions bearing axially in opposite directions against the surfaces of said disc to warp the same, means for minimizing friction between said portions and said disc surfaces and means for varying the relative axial positions of said portions of the frame on opposite sides of said disc to vary the degree of warping thereof, thereby permitting an adjustment of the magnitude of the torque transmitted for a given difference in rotational speed between said shafts.

3. A transmission for transmitting torque between two shafts dependent upon the relative speeds of rotation thereof comprising a disc attached to one of said shafts coaxial therewith and a frame attached to the other of said shafts, said frame having portions bearing axially in opposite directions against the surfaces of said disc to warp the same, and means for minimizing friction between said portions and said disc surfaces.

4. A clutch for controlling the application of power from one shaft to another, comprising a disc attached to one of said shafts coaxial therewith and a frame attached to the other of said shafts, said frame having two sets of axially relatively movable projections on either side of said disc staggered in angular position, said projections including means for minimizing surface friction between them and the surfaces of said disc, means for moving one of said sets of projections against said disc causing both sets of projections to bear against the surfaces of said disc to warp the same, thereby subjecting said disc to repeated cycles of reversing flexure as relative rotation between said disc and said frame takes place and permitting power to be applied from one shaft to the other through said disc with torque decreasing with a decrease in difference in speed between the two shafts.

5. A viscosimeter for solids comprising in combination a driving and a driven member relatively rotatable with respect to each other, one of said members being adapted to have attached thereto a specimen of solid material the viscosity of which is to be measured, the other of said members carrying a frame having projections adapted to bear against the specimen in opposite directions to subject the latter to successive cycles of reversal in strain as relative rotation between said driving and driven members takes place, thereby causing a torque to be transmitted through said specimen from one member to the other dependent upon the viscosity of said specimen, and indicating means responsive to said torque.

6. A device for transmitting force between two members dependent upon the relative velocity of said members comprising a viscous body attached to one of said members, means attached to the other of said members superficially engaging said viscous body and adapted to subject the latter to successive cycles of reversals in strain as relative motion between said members takes place, and means for minimizing surface friction between said viscous body and said engaging means, thereby causing the force transmitted to vary substantially only with the relative velocity of said members and the viscosity of said viscous body.

7. A viscosimeter comprising in combination driving and driven members movable with respect to each other, one of said members being adapted to have secured thereto a viscous body, the viscosity of which is to be determined, means attached to the other of said members engaging said viscous body and adapted to subject the latter to successive cycles of reversals in strain as relative motion between said members takes place, thereby causing a force to be transmitted from one of said members to the other dependent upon the viscosity of said viscous body, a third member for holding the driven member relatively stationary, and a mechanical force indicator interposed in one of said members to be responsive to force therein.

8. A viscosimeter comprising means for straining at a predetermined rate a specimen of viscous material, the viscosity of which is to be determined, a speed indicator responsive to the rate of strain and a force indicator responsive to the force exerted upon said specimen, thereby permitting a determination of the relationship between the rate of straining and the force exerted.

9. In a viscosimeter, movable means for alternately straining a viscous material in reverse directions at a rate proportional to the velocity of said means, a speed indicator responsive to said velocity, and a force indicator responsive to the force transmitted through said viscous material to afford a measure of the viscosity of said material.

10. A method of determining the viscosity of a substance which comprises subjecting the substance to rapid cycles of reversal in strain, determining the power dissipated therein, determining the rate of change in strain, and determining the relationship between said power and said rate of change in strain.

11. Apparatus for determining the viscosity of a substance composing a test specimen which comprises means for warping the specimen and for causing the warping of the specimen to be transferred along the surface thereof to produce a traveling wave, means for determining the force required to advance said traveling wave, and means for determining its speed of travel.

ALDA V. BEDFORD.